April 21, 1959  G. J. HUDSON ET AL  2,882,681
AIR JACKETED ANNULAR COMBUSTION CHAMBERS FOR JET-PROPULSION
ENGINES, GAS TURBINES OR LIKE PRIME MOVERS
Filed May 28, 1954  2 Sheets-Sheet 1

Inventors
G. J. Hudson
W. E. Gregory
By Stuart Downing Hubbell
Attys

April 21, 1959   G. J. HUDSON ET AL   2,882,681
AIR JACKETED ANNULAR COMBUSTION CHAMBERS FOR JET-PROPULSION
ENGINES, GAS TURBINES OR LIKE PRIME MOVERS
Filed May 28, 1954                                     2 Sheets-Sheet 2

Inventors
G.J.Hudson
W.E.Gregory
By Glascoct Downing Seebole
Attys.

United States Patent Office 2,882,681
Patented Apr. 21, 1959

2,882,681

AIR-JACKETED ANNULAR COMBUSTION CHAMBERS FOR JET-PROPULSION ENGINES, GAS TURBINES OR LIKE PRIME MOVERS

Geoffrey J. Hudson and William E. Gregory, Burnley, England, assignors to Joseph Lucas (Industries) Limited, Birmingham, England Application May 28, 1954, Serial No. 433,188

3 Claims. (Cl. 60—39.65)

This invention relates to combustion chambers for jet engines, gas turbines, or the like, of the annular type having combined therewith air jackets surrounding the inner and outer walls of the combustion chamber.

The object of the invention is to enable the air supplied by a blower to be conveyed to the two air jackets and the combustion chamber in substantially constant relative proportions.

It is customary to connect the blower to an annular duct or header, and to convey air from the header by passages leading to the combustion chamber and the air jackets. It has been found that when the blower and combustion chamber are in action, the air flow in the header is not always uniform over the whole of its radial width, and is moreover variable. Consequently the air is not at all times supplied to the combustion chamber and air jackets in the same relative proportions.

The invention comprises the combination of an annular header, and passages for leading the air from the header to the inner and outer air jackets and the combustion chamber respectively, the entrance to each passage being such that it extends across the whole or substantially the whole of the radial width of the header.

Figure 1:
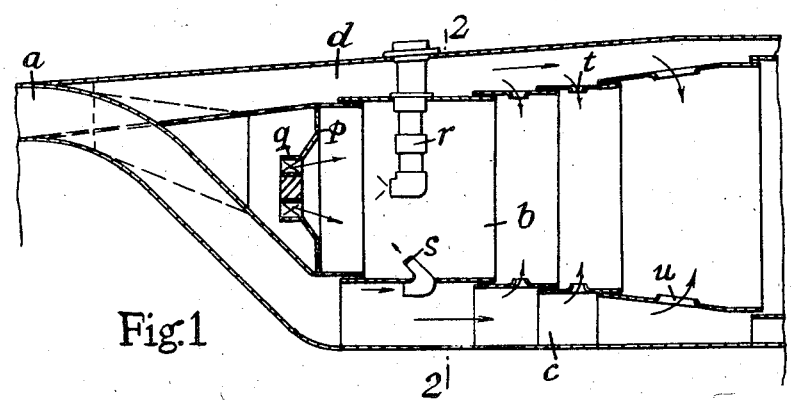
Figure 2:
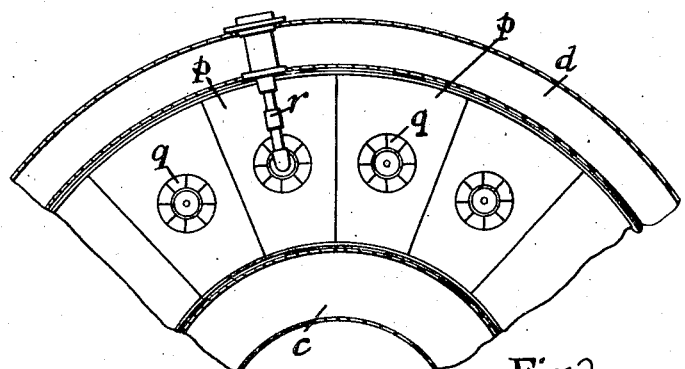
Figure 3:
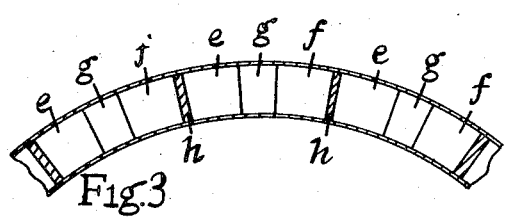
Figure 4:
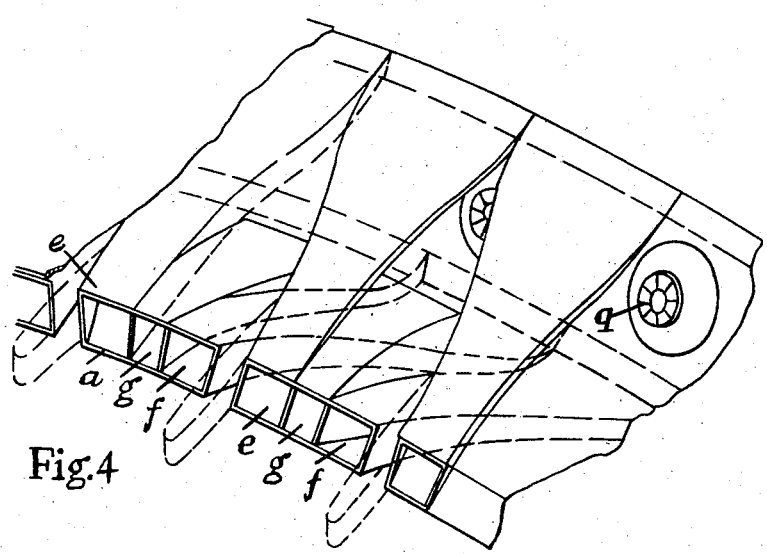
Figure 5:
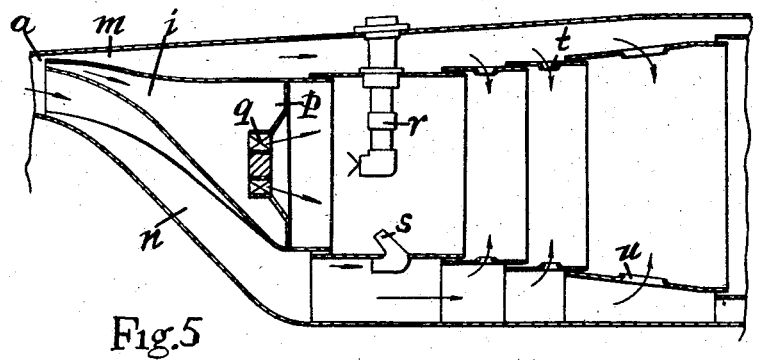
Figure 6:
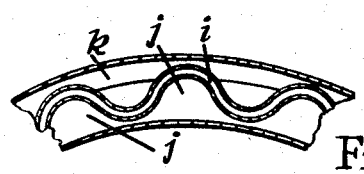

In the accompanying drawings, Figure 1 is a longitudinal section illustrating one application of the invention to a combustion chamber of annular form. Figure 2 being a cross section on the line 2—2, Figure 1. Figure 3 is a fragmentary cross sectional view of the air header. Figure 4 is a fragmentary diagram illustrating the relative dispositions of the air passage forming part of the construction shown in Figures 1–3. Figure 5 is a similar view to Figure 1 illustrating a modified construction of the air passages, and Figure 6 is a fragmentary cross sectional view of the air header of Figure 5.

Referring to Figures 1–4, there is provided a shallow sheet metal header $a$ of annular form, to which air is supplied by the blower. The header is connected to the adjacent ends of the combustion chamber $b$, and to the inner and outer air jackets $c$, $d$ by groups of contiguous sheet metal pipes. Each group consists of three pipes. The pipe $e$ in each group leads to the outer air jacket $d$; the pipe $f$ leads to the inner air jacket $c$; and the intermediate pipe $g$, which may have a smaller cross sectional area than the others, leads to the combustion chamber $b$. The groups are separated by spacers $h$.

At their inlet ends all the pipes in each group have flat side parts of radial form and these parts are in contact with each other. Moreover these ends lie wholly or partly within the header thus dividing the latter into a series of segments all of which are open to the annular supply duct.

Each pipe in each group is shaped to a gradually expanding form as represented in Figure 4, so that the velocity of the air entering the pipe can be reduced on flowing through the pipe with a minimum of energy loss. Considering the pipes which lead to the outer air jacket, these are also so shaped that their side surfaces are contiguous with each other at the entrance to this jacket.

Likewise the pipes leading to the other jacket, and those leading to the combustion chamber are similarly shaped. Moreover some of the pipes are bent in the direction of their length to enable their discharge ends to be brought into coincidence with the entrances of the inner air jacket and the combustion chamber.

In the foregoing the invention has been described in its rudimentary form, but it will be readily understood that the invention may be embodied in a variety of equivalent forms. Thus the entrance ends of the ducts may be made in a variety of shapes which enable them to be arranged in close contact with each other. Moreover they may be of different areas. Also each group may consist of any other convenient number of pipes, for example, five. In this case, two serve to supply the outer jacket, another two serve to supply the inner jacket, and the intermediate one serves to supply the combustion chamber.

In the modification illustrated by Figures 5 and 6 the header $a$ is constructed from sheet metal, and has an entrance of annular form for connection to a supply duct connected to the blower. The walls of the header are shaped to form a duct of gradually increasing width so that at the discharge end of the duct the walls are coterminous with the outer walls of the inner and outer air jackets. Within the header is arranged an intermediate sheet metal duct $i$ of gradually increasing radial width which at its discharge end is connected to the combustion chamber.

The entrance end of the intermediate duct $i$ is of annular form of any appropriate radial width and is shaped in cross section to a corrugated or equivalent form providing alternate crests and furrows. The depth of the corrugations is such that it is equal to or extends over a substantial part of the radial width of the entrance end of the header, so that this duct receives air from not only the central region of the header but also from the regions at or adjacent to the inner and outer peripheral walls of the header. Also the alternate furrows $j$, $k$ at opposite sides of the crests provide entrances to passageways $m$, $n$ leading to the two air jackets, so that the entrance end of each of these passageways extends over a larger part of the radial width of the header.

In the examples illustrated, the end of the combustion chamber to which air is conveyed by the above mentioned passages, is constructed from a plurality of sheet metal segments $p$, the side edges of which are contiguous as shown in Figure 2. In each segment is formed a depression as shown in Figures 1 and 5, and at the centre of each depression is arranged an air swirler $q$ through which air passes into the combustion chamber. Opposite each segment there is mounted an oil fuel nozzle supplied by a radial feed pipe $r$, the nozzle being arranged to eject the fuel in the form of a spray towards the incoming air. Air nozzles as $s$ are arranged to direct air from the jackets towards the spray, and additional air is supplied to the combustion chamber from the jackets through orifices as $t$, $u$.

By this invention the air stream entering the header from the blower, is divided into separate streams of the desired relative volumes in a convenient manner. Also the effects of non-uniformity of flow in the header being satisfactorily minimized, and the air is conveyed to the combustion chamber and jackets with a minimum of energy loss.

Having thus described our invention what we claim as new and desire to secure by Letters Patent is:

1. An annular combustion chamber for a jet propulsion engine, gas turbine or like prime mover, having in combination inner and outer air jackets, an annular header for air under pressure at one end of the combustion chamber, and air-distributing passageways leading from the header directly to the adjacent ends of the inner and outer air jackets and the combustion chamber respectively, the header end of each passageway having parts in direct communication respectively with the regions in the header adjacent the inner and outer peripheries of the header, so that air is conveyed by the passageways to the air jackets and combustion chamber in substantially constant relative proportions irrespective of any lack of uniformity between the air flows in the said regions of the header.

2. An annular combustion chamber according to claim 1, in which the air distributing passageways are arranged in groups separated from each other by spacers, each group consisting of three passageways which communicate respectively with the outer air jacket, the combustion chamber, and the inner air jacket.

3. An annular combustion chamber according to claim 1, in which the air-distributing passageways are formed in part by a first annular duct leading from the header to the air jackets, and in part by a second annular duct situated in the first duct and leading from the header to the combustion chamber, the second duct being provided with a corrugated entrance which communicates directly with the regions in the header adjacent to both the inner and outer peripheries of the header, and the first duct being divided by the second duct into passageways which lead to the inner and outer air jackets alternately, and each of which communicates directly with both of the said regions in the header.

References Cited in the file of this patent

UNITED STATES PATENTS

| | | |
|---|---|---|
| 2,647,369 | Leduc | Aug. 4, 1953 |
| 2,676,460 | Brown | Apr. 27, 1954 |

FOREIGN PATENTS

| | | |
|---|---|---|
| 986,583 | France | Mar. 28, 1951 |
| 686,908 | Great Britain | Feb. 4, 1953 |